United States Patent [19]

McGee

[11] 3,787,900
[45] Jan. 29, 1974

[54] ARTIFICIAL BONE OR TOOTH PROSTHESIS MATERIAL

[75] Inventor: Thomas D. McGee, Ames, Iowa

[73] Assignee: Iowa State University Research Foundation, Ames, Iowa

[22] Filed: June 9, 1971

[21] Appl. No.: 151,580

[52] U.S. Cl............................. 3/1, 32/8, 32/10 A, 32/12, 32/15, 106/35, 128/92 C, 128/92 G
[51] Int. Cl....... A61c 13/08, A61f 1/00, C09k 3/00
[58] Field of Search...... 32/8, 10 A, 12, 15; 106/35, 106/38.27, 38.3, 38.9, 39 R, 40 R, 85 P; 128/92 C, 92 G; 3/1

[56] References Cited
UNITED STATES PATENTS

| | | | |
|---|---|---|---|
| 2,072,212 | 3/1937 | Moosdorf et al. | 106/38.9 |
| 2,522,548 | 9/1950 | Streicher | 106/38.9 X |
| 2,486,811 | 11/1949 | Weyl | 106/46 |
| 3,473,599 | 10/1969 | Rose | 106/38.3 X |
| 2,726,963 | 12/1955 | Jackson | 106/46 |
| 2,479,504 | 8/1949 | Moore et al. | 106/38.3 |
| 3,662,405 | 5/1972 | Bortz et al. | 106/40 R X |
| 3,443,261 | 5/1969 | Battista et al. | 128/92 C X |
| 3,510,322 | 5/1970 | Higashi et al. | 106/35 |

OTHER PUBLICATIONS

"American Ceramic Society Bulletin," Volume 49, Jan.–June 1970, at page 482.

*Primary Examiner*—Allan Lieberman

[57] ABSTRACT

A prosthesis material useful for artificial bones or teeth is provided in the form of a heat-consolidated body composed essentially of a dense structurally integrated mixture of discrete microcrystals of a calcium phosphate compound together with discrete microcrystals of a refractory compound, such as the mineral spinel, aluminum phosphate, or aluminum oxide. The preferred calcium phosphate compound is whitlockite, but it can be used in combination with other more soluble calcium phosphate compounds.

11 Claims, No Drawings

ARTIFICIAL BONE OR TOOTH PROSTHESIS MATERIAL

BACKGROUND

Bone prosthesis are often needed for temporary or permanent use in men and animals. These may be to provide support until a fracture heals, to replace bone lost by accident or disease, to strengthen bone which has atrophied or lost mineral content, to elongate a bone which is too short or for a variety of other purposes.

Most individuals lose one or more permanent teeth during their lifetime. A need to permanently replace individual teeth exists. Sometimes the alveolar ridge becomes too thin to support conventional false teeth. Building this ridge - with or without artificial teeth - is needed for those suffering from this defect.

Most prior art bone prostheses are metals. Some of these are Vitalluim, stainless steel, chromium and titanium. These are used as spikes and splints and to replace ball and socket joints. They do not bond to the bone and are removed after normal healing whenever possible. The high electrical and thermal conductivity and the foreign chemical nature often results in undesirable side effects and unsatisfactory performance. Although mandibles have been partially replaced by a stainless steel truss the problem of joining to the remaining bone and the support of teeth and chewing forces has usually been insurmountable. Organic resins or silicone rubbers have sometimes been used to build up bones but these have insufficient strength, do not bond to the bone, are often rejected and are sometimes carcinogenic. This application discloses ceramic compositions which are compatible with natural bone and which do not have the deficiencies of metals or plastics.

DISCLOSURES OF INVENTION

In preparing a prosthesis material in accordance with the present invention, a principal ingredient is one or more calcium phosphate compounds. Such compounds can be utilized in the form of fine crystalline powders, either being obtained in this form, or ground to an average particle size of minus 200 mesh (American Standard Screen). Any of the various calcium phosphate compounds can be used in this form, but it is preferred to include at least a major portion of the calcium phosphate mineral known as whitlockite, which has the formula $Ca_3(PO_4)_2$. This compound is the least soluble in water, saliva, or tissue fluids of the known anhydrous calcium phosphate compounds. The others are also included in the calcium phosphate compounds of $CaO:P_2O_5$ ratio of 1:1 to 4:1. Known crystalline compounds within this ratio include $CaP_2O_6$, $Ca_7P_{10}O_{22}$, $Ca_2P_2O_7$, and $Ca_4P_2O_9$. All the calcium phosphate compounds within this ratio can be produced from other raw materials, such as $CaCO_3$ and $P_2O_5$ and are included within the broad scope of this invention.

Minor ingredients can be added to calcium phosphate compounds to cause different crystal structures with similar solubility characteristics. For example a small amount of fluorine or chlorine can be added to produce an intermediate compound $Ca_3(PO_4)_3F$ or $Ca_3(PO_4)_3Cl$ respectively and such additions are included in the scope of this invention where the Ca:P ratio is within the range 1:4 and the composition is essentially anhydrous. Similarly replacement of part of the Ca with Mg, Sr or Zn or similar divalent ions is an obvious modification which is included.

The other essential ingredient of the prosthesis material is a refractory compound which does not react with or form mutual solid solutions with calcium phosphate compounds. Although such refractory compound performs an important function in the prosthesis material, it desirably is substantially inert, that is, non-reactive, with respect to the calcium phosphate compound, making it possible to prepare heat-consolidated mixtures containing discrete microcrystals of the calcium phosphate compounds in eminent association with discrete microcrystals of the refractory compound.

The mineral spinel, which has the formula $MgAl_2O_4$ is a particularly desirable refractory compound. Other refractory compounds which can be used include aluminum phosphate ($AlPO_4$) and alumina ($Al_2O_3$). Additionally, mineral oxides having the spinel-type crystal structure can be useful, providing they otherwise meet the requirements set out above. Such compounds will have the general structure $AB_2O_4$ where both "A" and "B" are metal ions, usually different metal ions. For example, the ion A can be magnesium, strontium, barium, or zinc. The ion A can also be divalent forms of the transition elements, such as iron, cobalt, and nickel. The metal ion B can be aluminum, or a trivalent form of the transition elements such as iron, cobalt, or nickel. Further, although A and B are preferably different metal ions, this requirement is satisfied where A and B are the same metal, but are in different valence forms.

In general, the prosthesis material will contain a substantial proportion of both the phosphate compounds and the refractory compounds. For example, the prosthesis material after heat-consolidation, may contain a total of from 15 to 75 percent by weight of the calcium phosphate compounds, and from 25 to 85 percent by weight of the refractory compounds.

To provide for relatively limited solubility of the calcium phosphate component, it is desirable to use at least 45 weight percent of whitlockite of the total calcium phosphate. In other words, from 0 to 55 weight percent can be the more soluble calcium phosphate compounds listed above. While whitlockite can form the only calcium phosphate compound, it may be desirable to control the relative solubility, and to provide for some short term surface solubility by incorporating controlled proportions of the other calcium phosphate compounds in combination with whitlockite. For example, from 45 to 99 weight percent of whitlockite can be used together with 1 to 55 weight percent of at least one other phosphate compound from the group of compounds having $CaO:P_2O_5$ ratios within 1:1 and 4:1. Preferred compounds are $CaP_2O_6$, $Ca_2P_2O_7$, or $Ca_4P_2O_9$. Control of the relative proportions of the calcium phosphate compounds can also be based on the ratio of calcium to phosphorous. In general, it is desirable to employ a ratio of from 0.3 to 2.0 moles of calcium per mole of phosphorous. In certain preferred embodiments, a ratio of calcium to phosphorous of 0.5 to 1.2 moles calcium per mole of phosphorous can be used.

In preparing the mixtures of the ingredients for heat consolidation, it will be desirable to also have the refractory compound in a fine state of subdivision, such as an average particle size of less than 200 mesh (American Standard Screen). Where the refractory compound is formed in situ, it is also desirable to have the constituents react to form the refractory compound in a similar fine state of subdivision. The refractory compound will also be in crystalline form if used as such, or will be formed and crystallized during the heat-consolidation. The ingredients should be thoroughly and uniformly mixed. For example, all ingredients can be ground together in a ball mill, thereby assuring both uniform mixing and a fine state of subdivision.

The prosthesis material is formed from the mixture of ingredients by well known techniques of ceramic engineering, namely, vitrification, sintering, or casting. Casting is melting in a crucible and pouring into a mold where crystallization occurs. Vitrification is heat consolidation in the presence of a liquid phase while sintering is heat consolidation without the presence of a liquid phase. In general, the temperatures required for sintering or vitrification are those which produce a maximum bulk density together with a minimum apparent porosity. Even for the sintering technique, the temperatures required will be well below the melting temperatures of the refractory material. To promote the heat consolidation, especially when vitrification is the technique employed, minor amounts of fluxes, or liquid-phase providing components, can be utilized. In the ceramic arts, such ingredients are usually referred to as mineralizers. In terms of the total weight of the mixture being fired, they will usually constitute less than 5 percent by weight, and, of course, can be omitted entirely where the consolidation is by sintering without the presence of the liquid phase. Among the mineralizers which can be used are boric oxide, which can be added in the form of boric acid, cryolite ($Na_3AlF_6$), and titanium oxide ($TiO_2$). Other mineralizers include the fluorides, nitrates, and sulfates of the alkali and alkaline earth metals. Such ingredients do not change the essential properties of the prosthesis material, but only promote the desired heat consolidation to provide a dense structurally integrated product. After heat consolidation, whatever the technique employed, the resulting material will be characterized by discrete microcrystals of the calcium phosphate compounds in intimate association with discrete microcrystals of the refractory compounds. In general, the average size of the crystals will be less than 10 microns diameter.

Prior to firing, the mixture of ingredients can be placed in a mold to provide the desired final shape, or melted and poured into a mold to provide the desired shape, or the material can be formed in larger bodies, which can then be cut to the desired size and shape for use as bone or tooth implants. During firing, the mixture will shrink and consolidate, and become impervious with minimized porosity, and greatly increased structural strength. The optimum temperature for the heat consolidation can be readily determined by standard ceramic engineering procedures, a series of samples being run to determine at what temperature the apparent porosity reaches a low or minimum value in association with a high or maximum value for the bulk density. Apparent porosity and bulk density may be determined by the basic procedures described in: "Standard Method of Test for Water Absorption, Apparent Porosity, Bulk Density and Apparent Specific Gravity of Fired Porous Whiteware Products", ASTM Designation C 373-56, Pages 326–328, 1970 Annual Book of ASTM Standards, Part 13, American Society for Testing and Materials, 1916 Race St., Philadelphia, Pa.

Further details for practicing the present invention are shown in the following examples, but it should be understood that the invention is not limited to the specific examples.

EXAMPLE I

Equal molar ratios of $Ca_3(PO_4)_2$, whitlockite, and $MgAl_2O_4$ spinel (from $MgCO_3$ and $Al_2O_3$) of $TiO_2$, $H_3BO_3$ and $Na_3AlF_6$ as mineralizers using the following raw materials to produce approximately a 500 gram batch:

| Ingredient | Weight (gms.) |
|---|---|
| $MgCO_3$ | 88.10 |
| $Al_2O_3$ | 106.30 |
| $Ca_3(PO_4)_2$ | 296.65 |
| $Na_3AlF_6$ | 5.00 |
| $TiO_2$ | 25.00 |
| $H_3BO_3$ | 71.54 |
| | 591.59 |

These materials were ball milled with water for 14 hours. The slurry was dried and the cake was broken with a mortar and pestle. The powder was moistened with 5 percent polyvinyl alcohol solution and pressed with 10,000 psi pressure in a steel mold to produce ¼ inch diameter discs. These were isostatically pressed at 20,000 psi and fired for 8 to 12 hours to a thermal gradient furnace. Heat consolidation was achieved by vitrification due to the presence of the mineralizers. Although the temperatures employed were well below the melting temperature of spinel, the magnesium carbonate reacted with the aluminum oxide to produce crystalline $MgAl_2O_4$ in situ with the evolution of carbon dioxide. One advantage of the in situ formation is that the raw materials are more readily available and less expensive than the mineral spinel.

The results of these tests are shown in the following table:

| Firing Temperature | Apparent Porosity, % | Bulk Density, gm/cc |
|---|---|---|
| 1155°C | 1.49 | 2.75 |
| 1145°C | 1.23 | 2.77 |
| 1080°C | 1.85 | 2.90 |
| 970°C | 21.90 | 2.44 |

Based upon these results, additional specimens were produced and fired at 1,145°C as an optimum consolidation temperature. X-ray diffraction analysis revealed whitlockite, $Ca_3(PO_4)_2$, and spinel, $MgAl_2O_4$, as the major constituents.

Some of these specimens were ground to pass a 40 mesh testing sieve. After washing in acetone 10 grams of the powder was boiled for 14 hours in 50 ml distilled water. This was filtered, dried and weighed. Weight loss was less than 0.001 gms. The filtrate was titrated with 0.02 N $H_2SO_4$ using methyl red as an indicator. By assuming simple calcium ion solution this titration indicated 0.014 percent solubility.

Others of the specimen discs were polished by standard techniques to produce specimens for optical microscopic examination. These polished to a high gloss with a natural dental enamel appearance. Pores were round and isolated. The microstructure was one to five micron discrete grains of the two intermixed phases, the spinel and Whitlockite. Electron microprobe analysis of the distribution of the elements Mg, Al, Ca and P revealed that the Ca and P were associated and separated from the Mg and Al which were also associated. This demonstrated that the spinel had not appreciably reacted with the calcium phosphate.

Additional ones of the specimens were implanted subcutaneously in dogs. The pathologist did not observe any harmful reactions.

Example II

In a further experiment, following the procedure of Example I, specimens 15 mm long and 4–6 mm in diameter were prepared. Forty percent naphthalene crystals were incorporated in one half when the powder was pressed to produce 200 to 500 micron pores in that end after the specimens were fired. These were implanted in a dog in the bony sockets where a canine and a molar tooth had been extracted. The porous end was placed deepest in the socket and the dense end was covered with soft tissue of the gum. After 8 weeks X-rays revealed normal bony structure about the tooth. The radiologist interpreted the X-ray examination as showing normal peridontal tissue at the margins. After 10 weeks the gum was incised and extraction attempted. The tooth had bonded to the jaw so well that the usual extraction was impossible. This was not just soft tissue but a very strong bond which is believed to be mineralized bone. At no time were undesirable inflamatory or rejection reactions observed. The animal remained healthy.

Example III

Equal molar ratios of $Ca_3(PO_4)_2$ and $MgAl_2O_4$ (by in situ reaction) were incorporated in a body, with the addition of 5% $TiO_2$ and 1% $Na_3AlF_6$ by weight as mineralizers. A 500 gram batch was made with the following raw molecules in weight percent:

| Ingredient | Weight(gms.) |
| --- | --- |
| $MgCO_3$ | 92.7 |
| $Al_2O_3$ | 111.9 |
| $Ca_3(PO_4)_2$ | 312.3 |
| $Na_2AlF_6$ | 5.3 |
| $TiO_2$ | 26.3 |
|  | 548.5 |

This composition was prepared as disc specimens in the same manner as Example I. When fired in a gradient furnace the following properties were obtained:

| Firing Temperature | Apparent porosity, % | Bulk Density, gm/cc |
| --- | --- | --- |
| 1350°C | 1.95 | 3.01 |
| 1250°C | 5.04 | 3.06 |
| 1210°C | 11.50 | 2.91 |
| 1205°C | 14.30 | 2.86 |

X-ray diffraction of the specimens fired at 1,350°C revealed whitlockite and spinel to be the only phases present. When tested for solubility as described in Example I less than 0.001 grams from 10 grams was lost. When the filtrate was titrated no significant calcium was found in solution. When implanted subcutaneously in a dog there was no harmful reaction.

Using the same procedure, teeth can be prepared for implanting. If desired, the base of the teeth can be ground and tapered to provide a dove-tail, using a standard grinding machine and an aluminum oxide stone. Alternatively, a simple taper can be used. In either case, the jaw bone in which the tooth is to be implanted will be cut to provide a corresponding recess. Where desired for the base of the teeth to have porosity, this can be accomplished by adding a volatile material prior to firing, such as the naphthalene crystals referred to in Example II.

Example IV

A prosthesis material containing 1 mole $Ca_3(PO_4)_2$ to 3 moles of $MgAl_2O_4$ was made using $MgCO_3$, $Al_2O_3$, $CaHPO_4$ and $Ca_{10}(OH)_2(PO_4)_6$ as raw materials using the following formula:

| | |
| --- | --- |
| $MgCO_3$ | 56.28 gm |
| $Al_2O_4$ | 68.06 |
| $CaHPO_4$ | 10.07 |
| $Ca_{10}(OH)_2(PO_4)_6$ | 88.33 |
| | 222.74 gm |

The chemicals were mixed as dry powders with a mortar and pestle. They are moistened with 5 percent polyvinyl alcohol solution and pressed as 25 mm discs with a steel mold at 2,000 lb/in² applied load. These were then placed in rubber envelopes and isostatically pressed (placed in an hydraulic cylinder filled with water and subjected to hydraulic pressure of 15,000 lb/in²). The discs were placed in a furnace and fired to sinter them. The properties after firing for one hour at the indicated temperatures are shown below.

| Firing Temperature | Linear Shrinkage, % | Apparent Porosity, % | Bulk Density gm/cc |
| --- | --- | --- | --- |
| 1120°C | 2.87 | 56.1 | 1.46 |
| 1250°C | 3.20 | 55.0 | 1.47 |
| 1425°C | 10.3 | 46.3 | 1.83 |
| 1500°C | 14.9 | 8.7 | 2.74 |

As shown, without the mineralizers this composition must be fired to higher temperatures to cause heat consolidation (sintering). The residual porosity after firing to 1,500°C is still appreciable. Higher firing would reduce it further. The product at 1,500°C would be suitable for applications where impermeability is not essential.

A disc of the 1,500°C. sintered 1:3 molar ratio of whitlockite to spinel was implanted subcutaneously in a dog. After 5 weeks the implant was removed and the associated tissue subjected to histological analysis. The pathologist reported no undesirable reactions. He reported a thick connective tissue capsule with entrapped atrophic muscle. The lining of the capsule was immature fibrous tissue with a few foci of fibrin attached.

Example V

A prosthesis material of whitlockite, $Ca_3(PO_4)_2$ and berlinite, $AlPO_4$, was made using $Ca(H_2PO_4)_2 \cdot H_2O$ and $Al_2O_3$ as the starting materials according to the following reaction:

$$3Ca(H_2PO_4)_2 \cdot H_2O + 2Al_2O_3 \rightarrow Ca_3(PO_4)_2 + 4AlPO_4 + 9H_2O.$$

The raw materials, 78.9 grams of $Ca(H_2PO_4)_2 \cdot H_2O$ and 21.1 grams of $Al_2O_3$, were mixed as powders and pressed into discs as described previously. These were fired at 1,330°C to obtain a bulk density of 2.15 gm/cc and a porosity of 13.6 percent. Boiling a powdered specimen for 6 hours in distilled water produced no appreciable weight loss - verifying the insoluble nature of the prosthetic. This composition does not begin to sinter until heated above 1,300 and melts at about 1,380°C. It has a narrow firing range but excellent solubility properties.

Example VI

A prosthetic material was made with a 1:1 ratio of $Ca_3(PO_4)_2$ to $Al_2O_3$ from the following formula.

| | |
|---|---|
| $Ca(H_2PO_4)_2 \cdot H_2O$ | 15.9 weight % |
| $Ca_{10}(OH)_2(PO_4)_6$ | 39.4 % |
| $Al_2O_3$ | 44.7 % |
| | 100.0 % |

Specimens were prepared by the methods of Example I and fired to produce the following properties:

| Firing Temperature | Linear Shrinkage, % | Apparent Porosity, % | Bulk Density gm/cc |
|---|---|---|---|
| 1140°C | 0.1 | 37.1 | 2.04 |
| 1300°C | 0.2 | 24.4 | 2.54 |
| 1380°C | 23.2 | 0.0 | 2.43 |

Firing to 1,380°C. produced a dense non-porous material which did not lose appreciable weight when crushed and boiled for 6 hours.

Example VII

A prosthetic material composed of a 1:1 molar ratio of $Ca_3(PO_4)_2$ and $AlPO_4$ was made by melting and casting. This composition is 39% CaO, 11.7% $Al_2O_3$ and 49.3% $P_2O_5$ by weight. The raw materials were:

| | |
|---|---|
| 64.7 weight % | $Ca(H_2PO_4)_2 \cdot H_2O$ |
| 15.2 weight % | $Al_2O_3$ |
| 20.1 weight % | $Ca_{10}(OH)_2(PO_4)_6$ |

They were weighed, mixed with a mortar and pestle, melted in a refractory crucible at 1,450°C and poured into a preheated porcelain crucible. The result was a strong dense white crystalline product which had an apparent porosity of 0.0 percent and a bulk density of 2.86 grams/cc.

Prosthesis materials prepared in accordance with the present invention are expected to have many advantages. They should be suitable for bone replacements, including such prostheses as permanent bone bridges, bone segments, and artifical teeth. In these applications, the prostheses material will be compatible with bone and surrounding tissues and blood. Furthermore, the prosthesis material will have adequate strength to permit normal body stresses, and will provide low thermal and electrical conductivity. The prosthesis materials are non-toxic, and provide a mechanism for bonding to the natural bone, the implanted prosthesis undergoing mineralization to integrate it to the bone. Where desired, the prosthesis material can be ground or polished to provide smooth hard surfaces for joint replacement, or for the upper portions of teeth. For artificial teeth applications, the prosthesis material will resist bacterial and food corrosion, and will prevent conduction of heat from the oral cavity to the gums and jaw. Further, the prosthesis material is adapted for use as complete teeth, or as the base of teeth for receiving caps, will promote normal gum and peridontal membrane structure.

I claim:

1. A strong dense artificial bone or tooth prosthesis material in the form of a crystalline ceramic body which has been heat-consolidated to a substantially maximum bulk density with minimized apparent porosity, said body consisting essentially of a mixture of discrete microcrystals of a calcium phosphate component having a $CaO:P_2O_5$ ratio of 1:1 to 4:1 together with discrete microcrystals of a refractory component selected from the group consisting of $MgAl_2O_4$, $AlPO_4$, $Al_2O_3$, and mixtures thereof, said body containing from 15 to 75 percent by weight of said calcium phosphate component and from 25 to 85 percent by weight of said refractory component.

2. The prosthesis material of claim 1 in which said calcium phosphate component is whitlockite.

3. The prosthesis material of claim 1 in which said refractory compound means is $MgAl_2O_4$.

4. A strong dense artificial bone or tooth prosthesis material in the form of a crystalline ceramic body which has been heat-consolidated to a substantially maximum bulk density with minimized apparent porosity, said body consisting essentially of a mixture of discrete microcrystals of a calcium phosphate component selected from the group consisting of $Ca_3(PO_4)_2$, $CaP_2O_6$, $Ca_2P_2O_7$, $Ca_4P_2O_9$, and mixtures thereof, together with discrete microcrystals of refractory component selected from $MgAl_2O_4$, $AlPO_4$, $Al_2O_3$, and mixtures thereof, said body containing from 15 to 75 percent by weight of said calcium phosphate component and from 25 to 85 percent by weight of said refractory component.

5. The prosthesis material of claim 4 in which at least 45 weight percent of the said calcium phosphate component is $Ca_3(PO_4)_2$.

6. The prosthesis material of claim 4 in which substantially all of said refractory component is $MgAl_2O_4$.

7. The prosthesis material of claim 4 in which the total mole percent of said calcium phosphate component consists of from 45 to 99 weight percent of $Ca_3(PO_4)_2$ together with from 1 to 55 weight percent of at least one compound selected from the group consisting of $CaP_2O_6$, $Ca_2P_2O_7$, and $Ca_4P_2O_9$.

8. The prosthesis material of claim 4 in which the total of said calcium phosphate component provides a ratio of from 0.3 to 2.0 moles calcium per mole of phosphorous.

9. A strong dense artificial bone or tooth prosthesis material in the form of a crystalline ceramic body which has been heat-consolidated to a substantially maximum bulk density with minimized apparent porosity, said body consisting of a mixture of discrete microcrystals of $MgAl_2O_4$ together with discrete calcium phosphate microcrystals selected from the group consisting of whitlockite and mixtures of whitlockite with another calcium phosphate component selected from the group consisting of $CaP_2O_6$, $Ca_2P_2O_7$, $Ca_4P_2O_9$, and mixtures thereof, said mixture of whitlockite with said other calcium phosphate component containing at least 45 weight percent of said whitlockite, said body containing a total of 15 to 75 percent by weight of microcrystals of said whitlockite and said other calcium phosphate and from 25 to 85 percent by weight of said $MgAl_2O_4$ microcrystals.

10. The prosthesis material of claim 9 in which the total of said whitlockite and said other calcium phosphate component provides a ratio of from 0.3 to 2.0 moles calcium per mole of phosphorous.

11. The prosthesis material of claim 9 in which the total of said whitlockite aud said other calcium phosphate component provides a ratio of from 0.5 to 1.2 moles calcium per mole of phosphorous.

* * * * *